United States Patent [19]

Dang Vu et al.

[11] Patent Number: 5,073,352
[45] Date of Patent: Dec. 17, 1991

[54] APPARATUS FOR THE LOW PRESSURE REFORMING OF GASOLINES WITH HEATING BY SMOKE GASES

[75] Inventors: Quang Dang Vu, Neuilly; Jean-Paul Bournonville, Cergy Pontoise; Larry Mank, Orgeval; Jean-Charles Viltard, Marly le Roi, all of France

[73] Assignee: Institut Francais du Petrole, Rueil Malmaison, France

[21] Appl. No.: 562,532

[22] Filed: Aug. 3, 1990

Related U.S. Application Data

[62] Division of Ser. No. 382,886, Jul. 21, 1989, Pat. No. 4,973,401.

[30] Foreign Application Priority Data

Jul. 22, 1988 [FR] France .................................. 88 10039

[51] Int. Cl.⁵ .............................................. B01J 8/02
[52] U.S. Cl. ........................................ 422/213; 44/639;
208/134; 422/196; 422/200; 422/212; 422/218;
422/219
[58] Field of Search ............... 422/196, 200, 212, 213,
422/218, 219; 44/639; 208/134

[56] References Cited

U.S. PATENT DOCUMENTS

| 1,894,992 | 1/1933 | Hechenbleikner et al. | 422/218 |
| 2,163,599 | 6/1939 | Houdry | 422/218 |
| 2,521,538 | 9/1950 | Rees | 422/218 |
| 2,715,570 | 8/1955 | King | 422/218 |
| 2,835,560 | 5/1958 | Bason et al. | 422/218 |
| 3,535,879 | 10/1970 | Kuntz | 422/218 |
| 4,095,953 | 6/1978 | Gutterman et al. | 422/219 |
| 4,225,562 | 9/1980 | Anderson | 422/219 |
| 4,478,793 | 10/1984 | Vickers | 422/218 |

FOREIGN PATENT DOCUMENTS

17147 12/1928 Australia .......................... 422/218

Primary Examiner—Robert J. Warden
Assistant Examiner—Timothy M. McMahon
Attorney, Agent, or Firm—Millen, White & Zelano

[57] ABSTRACT

A reactor for low pressure catalytic reforming of gasolines with heating by smoke gases comprises: at least one device for introducing and removing the charge; at least one device for introducing and removing the catalyst; at least two elementary reaction cells spaced apart from each other are made of substantially vertical and parallelepipedic enclosures (an individual charge distributor, an individual processed charge collector, a catalytic bed); at least one general charge distributor; and at least one general processed charge collector.

8 Claims, 5 Drawing Sheets

APPARATUS FOR THE LOW PRESSURE REFORMING OF GASOLINES WITH HEATING BY SMOKE GASES

This is a division of application Ser. No. 07/382,886 filed July 21, 1989, now U.S. Pat. No. 4,973,401, issued Nov. 27, 1990.

BACKGROUND OF THE INVENTION

1. Field of the Invention

The invention relates to apparatus for conducting a process of reforming gasolines, under low pressure, in the presence of at least one catalyst, in which process the heat required for the reaction is brought by a smoke-based heat-carrying fluid coming, for example, from the combustion of air with a hydrocarbon mixture, for example natural gas or refinery gas.

2. Description of the Prior Art

It is known to improve the quality of gasolines, and particularly their octane number, by reforming at about 500° C., in the presence of hydrogen, in several solid catalytic beds comprising precious metals activated by different additives, such as rhenium and iridium for example (patents U.S. Pat. No. 4,588,495, FR-B-2,593,324, FR-B-2,597,496, FR-B-2,600,668).

The reforming of gasolines results from a combination of reactions whose balance is overall endothermic and a drop of the reaction pressure usually occurs as the transformations progress.

The traditional method of reforming gasolines comprises three, and generally four, adiabatic reactors, disposed in series and connected together by two, and generally three, heating ovens, whose role is to heat the reagents and to bring and maintain their temperature thus in the desired reaction temperature range.

The application of anti-pollution standards leads to a reduction of the lead concentration in gasolines and will in the long run result in suppressing organo-plumbic additives in motor car fuels for controlled ignition engines. Such regulations impose on refiners an increase in the severity of the operating conditions of the reforming units so as to satisfy the criteria of quality required for satisfactory operation of the motor vehicle engines: thus, refiners are led to reduce more and more the operating pressure of these reforming units. In fact, if the severity of the operating conditions is increased, in particular the octane number of the reformed products, the yield drops and the only means of compensating for such a drop of yield is to operate at a lower pressure.

But such low pressure operation is expensive and R. G. McClung et al. have recently shown (Hydrocarbon Processing, September 1983, pages 80-84) that such a system cannot actually go down below the limit of 1 MPa without serious drawbacks.

The major obstacle is due in particular to the pressure drop (for example 0.4-0.5 MPa) of the unit constructed from such a reaction system.

SUMMARY OF THE INVENTION

Now, the inventors have found that it is possible to considerably reduce this pressure loss and to carry out reforming at a pressure not exceeding 2 MPa, preferably 1 MPa.

The process of the invention is in particular based on the use of a reaction system in which the heat required for the reaction is brought to the catalytic bed(s) by a smoke (or heating gases) based heat-carrying fluid.

Thus, reforming in accordance with the invention is carried out in one or two reaction zones, one at least of which contains heat exchanging channels or spaces, preferably substantially parallelepipedic, inside which flows the heating smoke-based heat-carrying fluid, as will be explained further on in detail.

By way of indication, one of the hydrocarbon charges to be reformed may generally contained, in volume, 35 to 80% of paraffinic hydrocarbons, 14 to 51% of naphthenic hydrocarbons and 2 to 18% of aromatic hydrocarbons. It is generally formed essentially of gasolines. This charge is for example a naphtha distilling between about 55° and about 225° C.

Reforming in accordance with the invention is carried out on a mixture of said charge and recycled hydrogen (or recycling hydrogen), in a proportion such that the molar ratio of the hydrogen with respect to the charge of hydrocarbons to be processed (H2/HC) is usually between about 1 and 100, and preferably between 2 and 10.

Reforming is carried out at a temperature usually between about 300° and 700° C., preferably between about 400° and 600° C.

Any reforming catalyst known to a man skilled in the art may be used, in the form of grains which are for example substantially spherical.

Supported catalysts will for example be used comprising at least one noble metal of group VIII of the periodic classification of elements, generally platinum, preferably doped with at least one promoter such as indium, germanium, iridium (U.S. Pat. No. 2,848,377), rhenium (U.S. Pat. No. 3,415,737), tin (U.S. Pat. No. 3,700,588). Generally a halogen such as chlorine or fluorine is incorporated in the catalyst (FR-B-2,600,668).

The supports of the catalyst are usually chosen from the oxides of the metals of groups II, III and/or IV of the periodic classification of elements, such for example as magnesium, aluminum, titanium, zirconium, thorium or silicon oxides, taken alone or mixed together or with oxides of other elements from the periodic classification, such for example as boron. Charcoal may also be used. Zeolites or molecular sieves of type X or Y may also be used or of mordenite or faujasite type or of ZSM-5, ZSM-4, ZSM-8 L, etc. . . . type, as well as mixtures of oxides of metals from groups II, III and/or IV with zeolitic material.

Preferably, a support is used formed mainly of alumina, i.e., in which the alumina represents at least 50% by weight with respect to the total weight of the support and preferably at least 80% by weight, and more preferably alumina alone is used.

Figure 1:
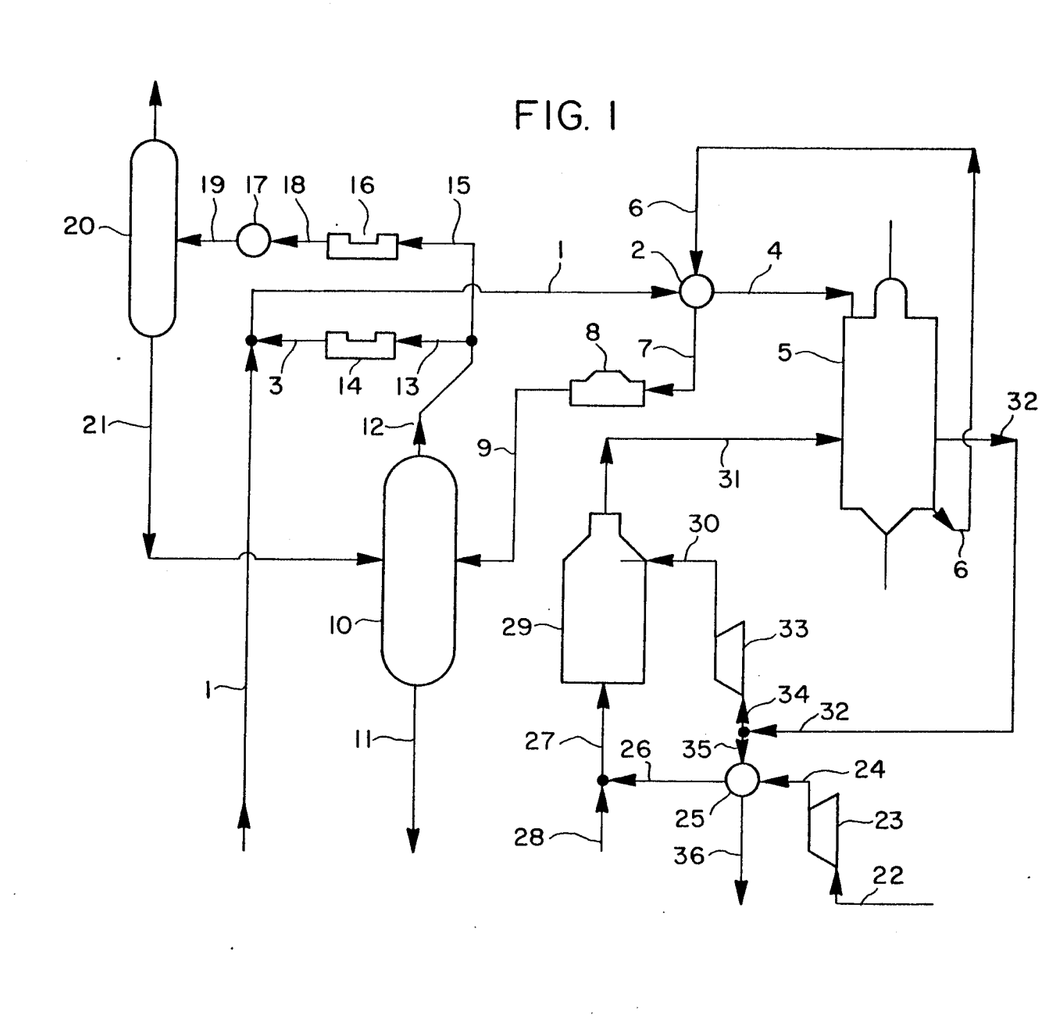
Figure 2:
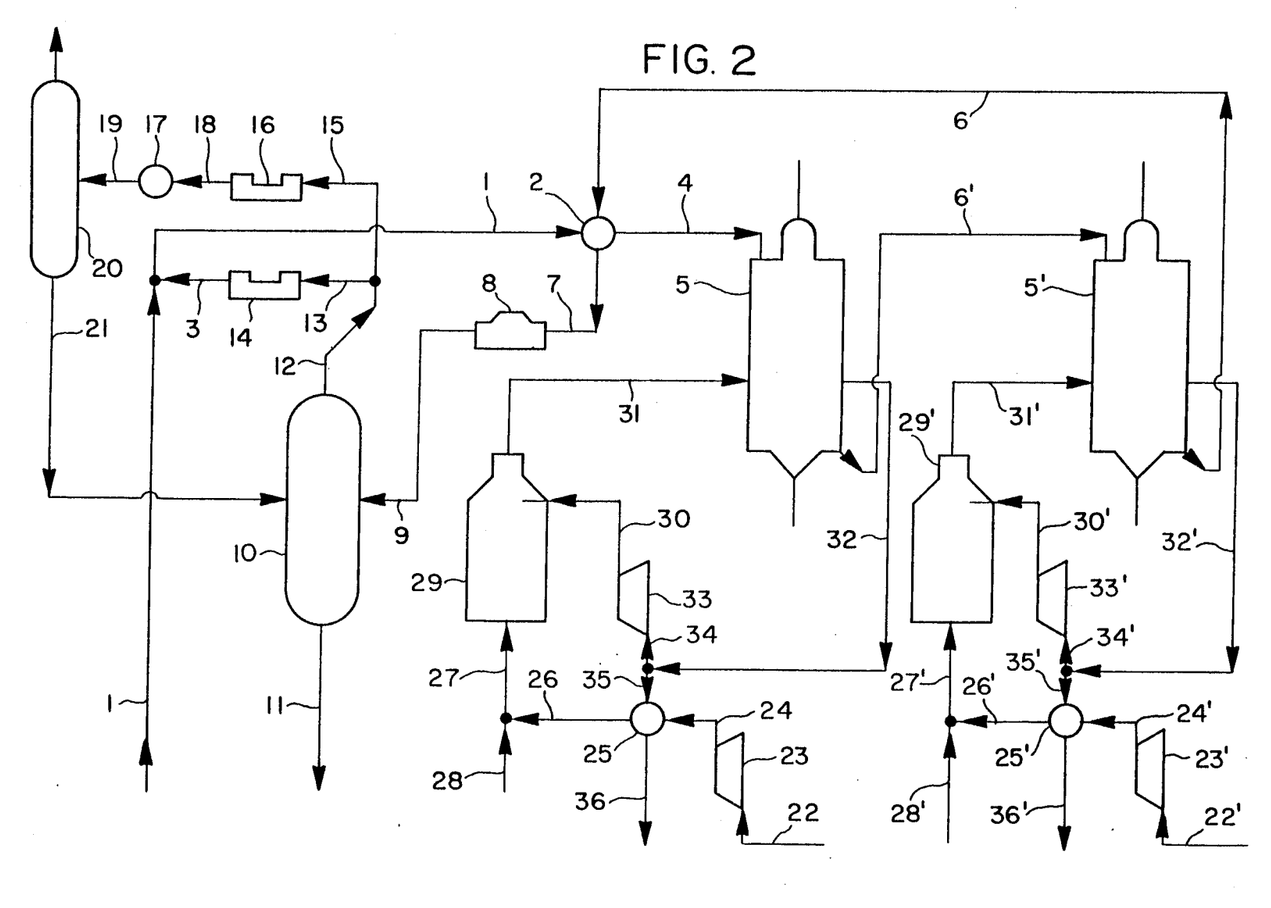

FIGS. 1 and 2, given by way of examples, illustrate examples of implementing the invention where the reforming takes place in a single reactor (FIG. 1) or in two reactors placed in series (FIG. 2).

The hydrocarbon charge to be processed, preferably desulfurated, for example a mixture of gasolines from direct distillation of crude oil and/or from distillation of thermally or catalytically cracked oil products, is fed through duct 1 of the reforming unit where it is mixed with hydrogen which is brought through duct 3 in a ratio generally about 1 to 100, preferably about 2 to 10 moles of hydrogen per mole of hydrocarbon charge to be processed.

The mixture thus formed which is then in accordance with the invention under a pressure ranging from 0.05 to 2.0 MPa, preferably from 0.05 to 1.0 MPa, is then preferably indirectly pre-heated by hot reaction effluent (coming from duct 6) through the heat exchanger 2 usually to a temperature between about 300° and 700° C., advantageously between about 400° and 600° C.

Said mixture then passes, through duct 4, into the reactor 5 in accordance with the invention and described subsequently, said reactor containing an above defined reforming catalyst.

In reactor 5, the gasolines are reformed, their molecules being at least partially transformed by dehydrogenation, isomerization, possibly dehydrocyclization and cracking reactions, into compounds having appreciably improved anti-knock properties.

These reactions result in a large production of hydrogen and a high heat demand. In conventional units with adiabatic reactors, the endothermicity of the reactions causes the temperature to drop rapidly and, in order to continue the reforming operations, it is then necessary to carry out intermediate heating, by feeding the reagents over one or more external ovens.

The methods of the invention are characterized in that the heat required for the reforming reactions is provided by a smoke (or heating gases) based heat-carrying fluid which is brought directly into the reactor, for example coming from the combustion in air of liquid or gas hydrocarbon mixtures, such as natural gas, refinery gas, flowing between the catalytic beds contained in reactor 5 (and possibly in reactor 5', in the case of two reactors as shown in FIG. 2). The heat-carrying fluid circuit is not open on to the reaction system.

To avoid too high an accumulation of coke, the catalyst may be constantly renewed; for that, used catalyst is continuously drawn off, towards the bottom of reactor 5 and continuously replaced by fresh (and/or regenerated) catalyst introduced at the top of reactor 5 (operation called a moving bed).

According to one embodiment of the invention (see FIG. 1), the reaction system only comprises a single reactor 5, the reaction effluent leaving said reactor through duct 6 for pre-heating the mixture (hydrocarbons+hydrogen) through the exchanger 2.

Sometimes advantageously, as a function of the requirements of the refiner, the reactor 5 is followed by a second reactor 5', either of the same type as reactor 5 (see FIG. 2), or of adiabatic type; the reaction effluent leaving 5 penetrates into 5' through duct 6'. On leaving the reactor 5', the reaction effluent passes through duct 6 which directs it to exchanger 2 where it will preheat the mixture (hydrocarbons+hydrogen).

It is advantageous to operate in the second reactor 5' at a mean temperature higher by 5° to 100° C., preferably by 10° to 50° C., than the temperature prevailing in the first reactor 5.

This second reactor 5' may be adiabatic. But it is desirable for it to be formed of an isothermal reactor of the same type as reactor 5, the heat required for the reforming reactions being fed directly into said reactor 5' also by means of a smoke (or heating gases)-based heat-carrying fluid, for example coming from the combustion in air of liquid or gas hydrocarbon mixtures, flowing between the catalytic beds contained in reactor 5' (this heat-carrying fluid being identical or not to that flowing through reactor 5).

This second reactor 5' may also operate with moving beds; for that, used catalyst is for example drawn off continuously at the bottom of reactor 5' and continuously replaced by fresh (and/or regenerated) catalyst fed in at the top of said reactor 5'.

In exchanger 2 (FIG. 1 or 2), the reaction effluent is cooled and the gasolines, whose research octane number (RON) has been brought to about 100, are at least partially condensed.

This effluent is then fed through duct 7 into the final condenser 8 for the final condensation step of the gasolines.

On leaving 8, the effluent passes through duct 9 into separator 10 which separates the reformate from a hydrogen rich gas mixture.

From the bottom of separator 10, through duct 11 are drawn off the gasolines obtained which form the reformate, and they are fed preferably to a stabilization zone (not shown in the figures).

The hydrogen rich gas mixture leaves separator 10 through duct 12 situated at its top. The hydrogen is recovered through duct 13 and it is recycled into duct 3 by means of compressor 14.

Excess gases formed by the reactions in 5 (and possibly in 5') leave through duct 15, are compressed by compressor 16 and are sub-cooled in exchanger 17 to which they are fed by duct 18.

From exchanger 17, the gases and their condensates pass through duct 19 into a separating balloon flask 20 where the hydrogen-condensate separation takes place. The condensates are recovered and fed through duct 21 into balloon flask 10.

In reactor 5 (see FIGS. 1 and 2), the heat required for the reforming reactions is, as we saw above, provided by a smoke (or heating gases or smoke gases)-based heat-carrying fluid.

For this, air is drawn in through duct 22 into a fan 23 which feeds the air, through duct 24, on to an air recuperator pre-heater 25, where it is heated to a temperature usually between 60° and 300° C., preferably between 100° and 250° C.

This pre-heated air then passes through duct 26 into a burner 27 (burning zone), contained in an oven 29 (or heating zone), where it serves as fuel for a hydrocarbon mixture, for example natural gas, fed through duct 28.

The amount of air used is advantageously between 1 and 5 times, preferably between 1.1 and 3.2 times, the amount of stoichiometric air required for combustion of the hydrogen mixture used.

The oven 29 may for example be a simple combustion chamber, or a boiler which operates by radiation and which possibly produces superheated steam.

On leaving oven 29, the temperature of the smoke gases (or heating gases) is preferably adjusted to a temperature very often between 400° and 900° C., preferably between 450° and 750° C., by recycling the heating gases through duct 30.

According to the methods of the invention, the rate of recycling said heating gases (weight ratio between recycled heating gases 34 and heating gases drawn off and not recycled 35) is then usefully between about 0.5 and about 200, preferably between about 2 and about 50.

These heating gases enter reactor 5 through duct 31 and leave through duct 32.

From 32, they are partially sucked in by fan 33 through duct 34 then recycled through duct 30 into oven 29. The rest of the heating gases not sucked in by 33 follows duct 35 to be cooled by the fresh combustion air through exchanger 25. It is then discharged through duct 36.

In the case where a second reactor 5' is used of the same type as the first reactor 5 (see FIG. 2), the heat required for the reforming reactions in reactor 5' may also be provided by a smoke (or smoke gases or heating gases)-based heat-carrying fluid. The formation and path of the heat-carrying fluid are for example similar to those described above in the case of reactor 5, with the use of equipment 22' to 36' similar to equipment 22 to 36.

BRIEF DESCRIPTION OF THE DRAWINGS

For the sake of simplicity, the following description only refers to reactor 5 of FIG. 1, but it may also apply to reactor 5' (when 5 and 5' are similar) of FIG. 2.

FIG. 8 gives by way of example profiles of ducts usable in the spaces or channels between two adjacent elementary catalytic reaction cells.

In the figures, the thick arrows C show the path of the charge (and of the processed charge) and the fine arrows G the path of the heating gases.

DESCRIPTION OF THE PREFERRED EMBODIMENTS

The object of the invention (see FIGS. 3 to 7) is a reactor for carrying out in particular reactions for reforming gasolines comprising at least one means for feeding a generally liquid charge 4, at least one means for removing the processed charge 6, means for inputting and drawing off a powdery solid, for example a catalyst; in the case of a reactor with moving bed(s), at least one means is used for continuously feeding fresh catalyst (5a) in the upper part of said reactor and at least one means for continuously removing the used catalyst (5b) from the lower part of said reactor.

The possible means 5b for removing the powdery solid (in the rest of the description, "catalyst" will be referred to as the powdery solid) may comprise at least one drawing off funnel, having a conical or pyramidal shape, whose apex is directed downwards, which apex contains an opening sufficiently large for removing the used catalyst from the reactor.

The reactor of the invention is characterized in that it comprises at least two elementary catalytic reaction cells 52 which are not adjacent each other (i.e., spaced from each other) and not adjacent to the substantially vertical walls 53, 54 (i.e., spaced from vertical walls 53, 54) of said reactor.

Said cells are substantially vertical and parallelepipedic, substantially parallel with each other (and with walls 53 and 54 of said reactor).

Each internal hollow substantially parallelepipedic channel or space (heat exchanger) 51 situated between two cells 52 or situated between a substantially vertical wall 53 or 54 of the reactor and the cell 52 the closest to this wall and substantially parallel to said wall, is intended for the flow of the heating gases. Thus, each cell 52 is sandwiched between two spaces free of catalyst. These spaces or channels 51 are open on all their "faces" substantially perpendicular to the substantially vertical sidewalls 53 and 54 of the reactor, so as to permit the intake of a heating gas-based heat-carrying fluid into the reactor, then flow thereof between the cells 52 and finally discharge thereof from the reactor.

Figures 4, 8A, 8B, 8C:
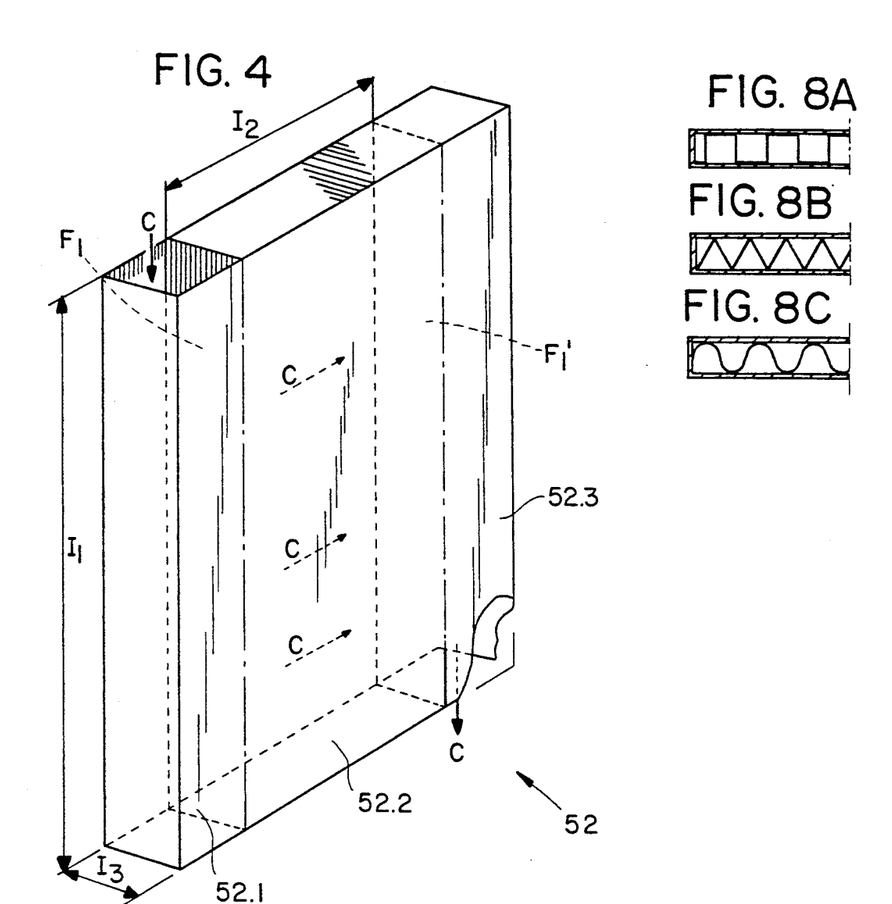
FIG. 4 illustrates one of the essential devices contained in reactor 5: an elementary catalytic reaction cell.
Figure 5:
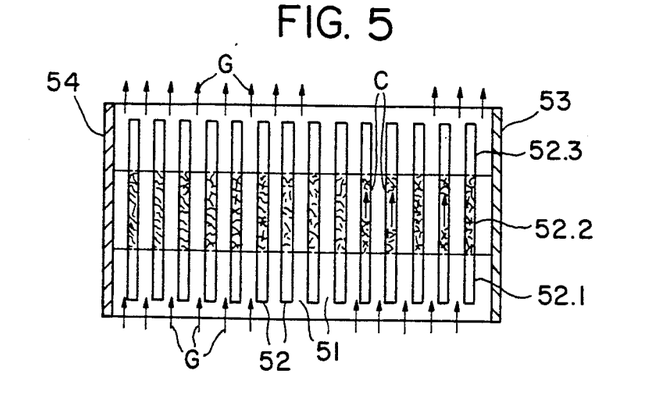
FIG. 5 corresponds to the horizontal section AA of the reactor of FIG. 3.
Figure 6:
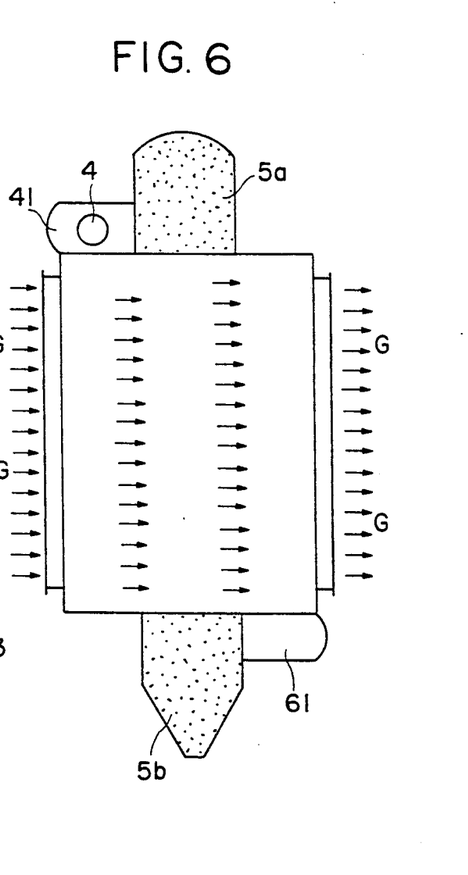
FIG. 6 shows a vertical section of the reactor of FIG. 3, which section is made in the space (or channel) between two adjacent elementary catalytic reaction cells.
Figure 7:
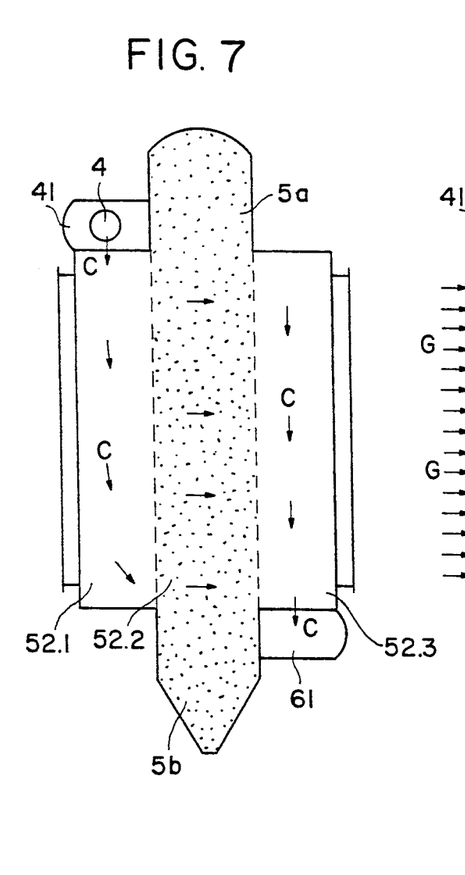
FIG. 7 corresponds to a vertical section of the reactor of FIG. 3, through an elementary catalytic reaction cell.

Each elementary catalytic reaction cell 52 is formed of three substantially parallelepipedic enclosures defined hereafter:
an individual charge distributor 52.1,
an individual processed charge collector 52.3,
a catalytic bed (moving for example) 52.2 inserted between said individual distributor and said individual collector.

Said bed 52.2 is open, over the whole of a substantially vertical thin face $F_1$, on said individual distributor 52.1 and open, over the whole of its other thin face $F'_1$ substantially parallel to $F_1$, on to said individual collector 52.3. These thin faces $F_1$ and $F'_1$ are each defined by a wall which is permeable to fluids and impermeable to the solid catalytic particles (for example a Johnson type grid or comprising profiled wires or any other equivalent means).

Each of the two substantially vertical wide faces of said bed 52.2 is closed by a sealed wall whose extensions beyond said bed 52.2 form sealed walls of the corresponding individual distributor 52.1 and individual collector 52.3.

The faces or walls of the elementary catalytic reaction cells 52 are for example formed from thin flat metal sheets or any equivalent means.

Figure 3:
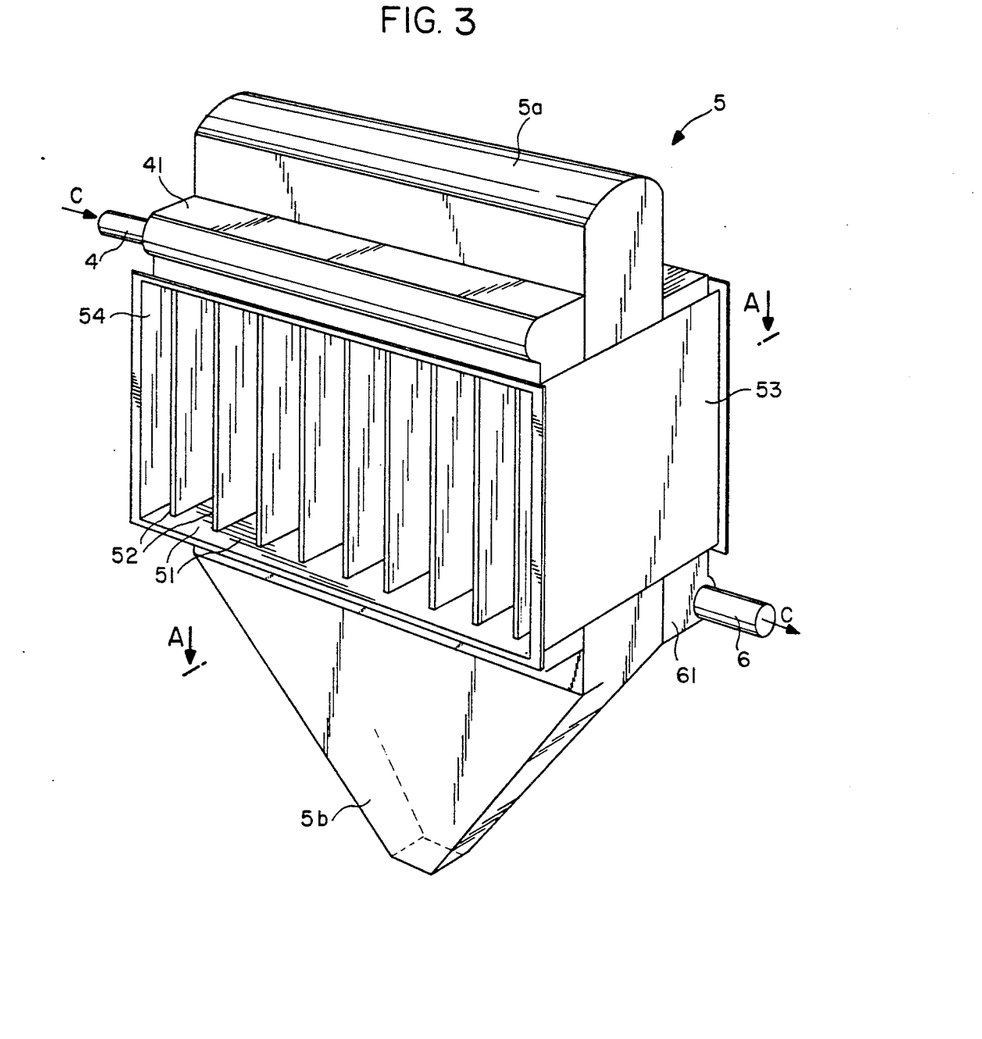
FIG. 3 illustrates a preferred reactor model usable particularly in the reforming processes of the invention, this model corresponding to reactor 5 and, possibly, to reactor 5'.

In the case where each bed 52.2 is a moving bed, it communicates, through its substantially horizontal upper thin face, with the means for introducing fresh catalyst 5a and, through its substantially horizontal lower thin face, with the means for removing the used catalyst 5b. The reactor of the invention further comprises:

at least one general charge distributor 41, connected to the charge introduction means 4 and to all the individual charge distributors 52.1 through one of their substantially horizontal thin faces, and at least one general processed charge collector 61, connected to the processed charge removal means 6 and to all the individual processed charge collectors 52.3 through one of their substantially horizontal thin faces which is substantially diagonally opposite, with respect to the center of the corresponding catalytic bed 52.2, to the substantially horizontal thin face of the corresponding individual distributor 52.1 through which the latter is connected to the general distributor 41.

Said reactor also comprises:
at least one sealed wall connecting together the substantially horizontal upper sides of the opposite wide faces of two catalytic beds 52.2 next to each other,
at least one sealed wall connecting together the substantially horizontal lower sides of said opposite wide faces of two catalytic beds 52.2 next to each other,
at least one sealed wall connecting the substantially horizontal upper side of the wide face of the catalytic bed 52.2 the closest to each wall 53 or 54 of the reactor (which wall is substantially vertical and substantially parallel to said bed) to said wall, and
at least one sealed wall connecting the substantially horizontal lower side of the wide face of the catalytic bed 52.2 the closest to each wall 53 or 54 of the reactor (which wall is substantially vertical and substantially parallel to said bed) to said wall.

These four categories of sealed walls are for example formed from thin metal sheets, preferably corrugated thin metal sheets, the developed area of each of them being advantageously between 1 and 500 times, preferably between 2 and 50 times, the area of the vertical walls (for example metal sheets) of the catalytic beds which they connect.

The individual distributors 52.1 and the individual collectors 52.3 advantageously have the same thickness $l_3$ and the same height $l_1$ as the catalytic beds 52.2.

In a preferred embodiment of the reactor of the invention, the height $l_1$, the width $l_2$ and the thickness $l_3$ of each catalytic bed 52.2 comply with the following conditions (1 mm = $10^{-3}$ m):

$l_1 > l_2 > l_3$ with, preferably, $l_1 \geq 2\ l_2$;

50 mm $\leq l_2 \leq$ 10,000 mm, preferably 100 mm $\leq l_2 \leq$ 5,000 mm.

2 mm $\leq l_3 \leq$ 2,000 mm, preferably 5 mm $\leq l_3 \leq$ 500 mm.

Too small a width $l_2$ may cause a poor distribution of the reagents between the catalytic beds, whence unsatisfactory reforming; on the other hand, too great a width $l_2$ would tend to cause the mean pressure to increase within the catalyst and would lower the efficiency of the operation.

So as to have a better conversion of the gasolines during use of the reactor of the invention, it may be preferable for thickness $l_3$ of each catalytic bed 52.1 ($l_3$ corresponding also to the spacing between the internal hollow heat exchanging channels or spaces 51) to be such that:

$$\frac{l_3}{2} \geq dp_m \geq \frac{l_3}{200}, \text{ preferably } \frac{l_3}{5} \geq dp_m \geq \frac{l_3}{100}$$

where $dp_m$ corresponds to the mean hydraulic diameter of a catalyst grain which represents the mean size of a catalyst grain (dp = hydraulic diameter of a catalyst grain = 6V/S, where V is its volume and S its area).

When the catalyst grains are spheres, $dp_m$ represents the mean diameter of said spheres.

In each substantially parallelepipedic hollow internal space or channel 51 situated between two elementary catalytic reaction cells 52 next to each other and in each substantially parallelepipedic hollow internal space or channel 51 situated between a wall 53, 54 of the reactor and the elementary catalytic reaction cell 52 the closest to this wall and substantially parallel to this wall, may be formed substantially horizontal adjacent ducts by means of corrugated metal sheets, the sections of said ducts having one of the following forms: square, rectangular (FIG. 8A), triangular (FIG. 8B), sinusoidal (FIG. 8C) or equivalent.

The present invention also relates to a catalytic reforming process in which a generally liquid hydrocarbon charge is caused to flow, under reforming conditions, in the presence of hydrogen, through a reaction zone (see FIGS. 3 to 7) in which the pressure is ranging from 0.05 to 2.0 MPa, preferably from 0.05 to 1.0 MPa, said zone containing:

on the one hand, at least two elementary catalytic reaction spaces 52 which are not adjacent and are substantially parallelepipedic, each formed of an individual substantially parallelepipedic distribution zone 52.1, an individual substantially parallelepipedic collecting zone 52.3 and a catalytic bed 52.2, inserted between said two substantially parallelepipedic zones 52.1 and 52.2, on the other hand, substantially parallelepipedic hollow internal spaces 51.

Said elementary catalytic reaction spaces 52 and said hollow internal spaces 51 are disposed substantially vertically and substantially parallel with each other, each elementary catalytic reaction space 52 being sandwiched between at least two hollow internal spaces 51 through which flow, substantially horizontally, the heating gases (defined above) which bring the heat required for the reforming reaction.

In this improved method:

the hydrocarbon charge is fed into a general distribution zone 41, said charge, coming from the general distribution zone 41, is distributed to the individual distribution zone 52.1 of each elementary catalytic reaction space 52, said charge, from each individual distribution zone 52.1, is fed to each corresponding catalytic bed 52.2 which it flows through substantially horizontally, the charge and the heating gases then flowing substantially parallel and co-currentwise, the processed charge is recovered, at the outlet from each catalytic bed 52.2, in the corresponding individual collecting zone 52.3, the processed charge is removed from each individual collecting zone 52.3 into a general collecting zone from which said processed charge is then drawn off.

In addition, in each elementary catalytic reaction space 52, the position of the inlet for the charge into the individual distribution zone 52.1 is substantially diagonally opposite, with respect to the center of the corresponding catalytic bed 52.2, to the outlet position of the processed charge from the corresponding individual collecting zone 52.3.

Each catalytic bed 52.2 is preferably of a moving type, the catalyst grains being for example fed continuously into the upper part of each catalytic bed 52.2 and drawn off continuously from the lower part of each catalytic bed 52.2 after passing from top to bottom inside each bed 52.2.

The catalyst grains may then be drawn off from the lower end of a bell-mouthed zone having the form of a cone or a pyramid whose apex is turned downwards, said zone being connected to the lower part of each catalytic bed 52.2.

It is advantageous for the heating gases to flow, inside each hollow internal space 51, in substantially horizontal adjacent ducts (see FIG. 8) formed of corrugated metal sheets, the section of said ducts having one of the following forms: square, rectangular (FIG. 8A), triangular (FIG. 8B), sinusoidal (FIG. 8C) or equivalent. These ducts in particular make it possible to provide a more homogeneous flow of the heating gases through all the hollow internal spaces 51 and constantly cause a flow of said gases very substantially parallel to that of the charge through the catalytic beds 52.2.

In a preferred embodiment of the methods of the invention, the height $l_1$, the width $l_2$ and the thickness $l_3$ of each catalytic bed 52.2 comply with the following conditions (1 mm = $10^{-3}$ m):

$l_1 > l_2 > l_3$, with preferably, $l_1 \geq l_2$.

50 mm $\leq l_2 \leq$ 10 000 mm, preferably 100 mm $\leq l_2 \leq$ 5 000 mm.

2 mm $\leq l_3 \leq$ 2 000 mm, preferably 5 mm $\leq l_3 \leq$ 500 mm.

So as to increase the efficiency of the methods of the invention, it may be preferable for the thickness $l_3$ of each catalytic bed 52.3 ($l_3$ corresponding also to the spacing between the hollow internal heat exchanging spaces or channels 51) to be such that:

$$\frac{l_3}{2} \geq dp_m \geq \frac{l_3}{200}, \text{ preferably } \frac{l_3}{5} \geq dp_m \geq \frac{l_3}{100}$$

where $dp_m$ corresponds to the mean hydraulic diameter of a catalyst grain which represents the mean size of a catalyst grain (dp=hydraulic diameter of a catalyst grain=6 V/S, where V is its volume and S its area).

The invention also relates to a catalytic reforming process in which a generally liquid hydrocarbon charge is caused to flow, under reforming conditions, in the presence of hydrogen, successively through two reaction zones, in at least the first of which said process takes place as described above.

In the different methods of the invention, the hourly flowrate per unit of mass of hydrocarbon charge to be processed is usually equal to 1 to 10 times, preferably 2 to 5 times, the total mass of catalyst present in the reaction zone(s).

The following examples illustrate the invention without limiting the scope thereof:

EXAMPLE 1 comparative

A charge containing a mixture of crude oil naphtha and thermal cracking-coking naphtha is fed into an industrial catalytic reforming unit operating conventionally with four adiabatic reactors having moving beds.

The hydrocarbon charge thus formed has the following composition:
Paraffins: 55.3%
Naphthenes: 38.7%
Aromatics: 6.0%

This charge is mixed with recycling gas comprising 84% hydrogen so as to form a reaction mixture whose molar ratio of the hydrogen with respect to naphtha is equal to 4.

The reagent thus obtained is directed on to the reaction system containing a catalyst supported by alumina of specific area 220 m²/g and of pore volume 0.57 cm³/g) and containing platinum, chlorine and rhenium (by weight: 0.35% Pt; 0.25% Re; 1.12% Cl).

The hourly flowrate per unit of mass of the naphtha charge is equal to about 3.2 times the mass of catalyst present in the reaction system (in all four reactors).

The pressure at the inlet to the first reactor is maintained at 1.2 MPa and it can be seen that the output pressure of the last reactor is equal to 0.93 MPa, namely a drop of 0.27 MPa through the reaction system.

The temperatures at the inputs of the four reactors are adjusted to 502° C. through controlling the preheating and heating ovens.

At the outlet of each reactor, the following temperatures are noted:
1st reactor: 417° C.
2nd reactor: 436° C.
3rd reactor: 468° C.
4th reactor: 492° C.

Thus, at the end of the unit, a reformate with 98 RON (research octane number) is obtained with the following yields (% by weight with respect to the charge):
$H_2$: 2.8%
$C_{1-2}$: 3.5%
$C_{3-4}$: 7.9%
Reformate ($C_5+$): 85.8%

EXAMPLE 2

In a pilot catalytic reforming unit, whose reactor was constructed in accordance with FIGS. 3 to 7 and 8A and whose moving catalytic beds (height $l_1$, width $l_2$, thickness $l_3$) are such that $l_1=2\,500$ mm; $l_2=800$ mm, $l_3=90$ mm and $l_3/dp_m=15$, the same catalyst was used as before and the same charge (naphtha) was injected as in example 1, mixed with hydrogen in a molar ratio of 4.

The charge enters the reactor (FIG. 1) at 450° C. (namely a temperature less by 52° C. than the input temperature of the first example) and its temperature is adjusted with a smoke flow whose input temperature is kept at the value of 610° C. by mixing oven smoke streams with reactor output smoke streams which are at 510° C., (the charge and the smoke streams enter on the same side of the reactor).

The rate of recycling the smoke (in weight ratio) is about 6.5 and the excess or air used is about 100%.

At the output, the reformate obtained is condensed, the hydrogen required for mixing is recycled to the input and the drain of manufactured gases is adjusted so as to obtain an output pressure equal to 0.53 MPa.

The hourly charge flowrate per unit of mass is adjusted so as to obtain a reformate of 98 RON.

At this moment, it is noted that:

the ratio between the hourly injected flowrate per unit of mass and the mass of catalyst contained in the reactor is equal to 3.3 instead of 3.2 during adiabatic working (example 1);

the pressure at the input of the reactor is equal to 0.55 MPa against 0.93 to 1.23 MPa at the input of the adiabatic reactors (example 1);

the temperature of the reagents, although equal to 495° C. at the output, have however a minimum of 420° C. within the reactor;

the yields are established in the following way (weight % with respect to the charge):
$H_2$: 3.1%
$C_{1-2}$: 2.6%
$C_{3-4}$: 5.8%
Reformate ($C_5+$): 88.5%

Despite an input temperature (450° C.) very much less than the input temperature (502° C.) in the first example, because of the low pressure operation which this isotherm reaction system allows, 2.7 points are gained on the reformate yield and 0.3 point on that of hydrogen.

If the moving beds are replaced by fixed beds (the other equipment and operating conditions remaining the same), the following yields are obtained (weight % with respect to the charge):
$H_2$: 3.1%
$C_{1-2}$: 2.7%
$C_{3-4}$: 6.0%
Reformate ($C_5+$): 88.2%

EXAMPLE 3 comparative

The preceding test (example 2, with moving beds) was repeated, but the flow direction of the reagents was reversed by causing them to enter on the side from which the smoke streams forming the heat-carrying fluid leave.

To keep the same octane number for the reformate, the input temperature of the smoke streams must be constantly raised as well as the output temperature of the reagents.

After 72 hours, the test was stopped, the output temperature of the reagents then being 510° C.

EXAMPLE 4 comparative

The same reactor is used as in example 2, the thickness of the catalytic beds (which are mobile) being such that $l_3/dp_m = 1.5$ (the other equipment and operating conditions remaining identical).

Because of a much higher exchange surface/catalytic volume ratio, the temperature of the smoke streams was lowered as well as those of the reagents, at the out let of the reactor.

But an increase in the light hydrocarbon yield and a corresponding reduction of the production of hydrogen were seen, the reformate yield having lost 1.5 points with respect to example 2.

EXAMPLE 5

Two moving bed reactors are provided in which the catalyst (identical to that of example 1) is distributed in a ratio of 50/50.

The first reactor is identical to that of example 2 (with flow of a smoke based heat-carrying fluid) and the second is adiabatic (without heat-carrying fluid).

The same operating conditions as those of example 2 being respected, it was noted that:

The hourly flowrate per unit of mass of the charge is equal to 3.4 times the mass of catalyst contained in the whole of the reaction system (i.e., the two reactors);

the input pressure in the first reactor has climbed to 0.58 MPa instead of 0.55 MPa in the single reactor operation (example 2), the output pressure of the second reactor being 0.54 MPa;

in the first reactor, the input temperature had to be raised to 503° C. and in the second reactor the products leave at 493° C.;

the yields measured (in weight % with respect to the charge) did not vary substantially with respect to those of example 2 (moving beds):

$H_2$: 3.2%
$C_{1-2}$: 2.5%
$C_{3-4}$: 5.6%
Reformate ($C_5+$): 88.7%

EXAMPLE 6

Two isotherm reactors in accordance with the invention are disposed in series (FIG. 2), having moving beds (with a catalyst identical to that of the preceding examples and distributed in a ratio of 50/50 in each of the reactors).

The same operating conditions were used as in example 2. However:

in the first reactor, the smoke streams have the same temperatures as in example 2, i.e., 610° C. (input) and 510° C. (output); but the excess of air used is only about 10% and, to arrive at 610° C. at the input, it was necessary to increase the smoke recycling rate from about 6.5 to about 14 (weight ratio);

in the second reactor, the smoke streams enter at 560° C. and leave at 510° C.; the same excess of air is used, but the rate of smoke was increased to about 29.5;

in the first reactor, the input temperature of the reagents was 450° C., which temperature is then adjusted and kept at 485° C. by the smoke flow (the output temperature of the first reactor is then 485° C.);

in the second reactor, the reagent input temperature is 485° C., which temperature is then adjusted and kept at 495° C. by the smoke flow; the output temperature of the second reactor is then 495° C.

With these arrangements, the hourly treated flow per unit of mass can be raised to 3.8 times the mass of catalyst contained in the whole of the reaction system.

Finally, the yields (in weight % with respect to the charge) are the following:

$H_2$: 3.4%
$C_{1-2}$: 2.4%
$C_{3-4}$: 5.3%
Reformate ($C_5+$): 88.9%

We claim:

1. A reactor comprising at least one means for introducing a charge, at least one means for removing the processed charge, at least one means for introducing a powdery solid in the upper part of said reactor, at least one means for removing said solid from the lower part of said reactor, said reactor further comprising:

at least two elementary reaction cells spaced apart from each other and spaced apart from the walls of said reactor, substantially vertical and parallelepipedic and substantially parallel to each other, at least two of said elementary reaction cells next to each other defining a substantially parallelepipedic channel; and at least one of said walls together with an elementary cell closest to said wall and substantially parallel to said wall defining a substantially parallelepipedic channel; said channels being suitable for gas flow, each of said cells being formed of the three following substantially parallelepipedic enclosures:

an individual charge distributor, an individual processed charge collector, a powdery solid bed inserted between said individual distributor and said individual collector, said bed being open, over the whole of a substantially vertical first face, of said individual distributor and open, over the whole of the first face of said individual collector, said first faces each being defined by a wall permeable to fluids and impermeable to solid particles, said powdery solid bed communicating, by an upper substantially horizontal first face thereof, with said solid introduction means and, by a first substantially horizontal lower face thereof, with said solid removal means, said bed having two substantially vertical second faces closed by a sealed wall whose extensions beyond said bed form sealed walls of said individual distributor and said individual collector, at least one sealed wall connecting together the substantially horizontal upper sides of opposite wide faces of two solid beds next to each other, at least one sealed wall connecting together the substantially horizontal lower sides of opposite second faces of two solid beds next to each other.

at least one sealed wall connecting the substantially horizontal upper side of the second face of the solid bed the closest to each wall of said reactor and substantially parallel to this wall, to said wall, at least one sealed wall connecting the substantially horizontal lower side of the second face of the solid bed the closest to each wall of said reactor and substantially parallel to this wall, to said wall, at least one general charge distributor, connected to said means for introducing the charge and to all the individual distributors of the charge by one of their substantially horizontal first faces, at least one general processed charge collector connected to said processed charge removal means and to all the individual collectors of the processed charge by one of their substantially horizontal first faces which is substantially diagonally opposite, with respect to the center of the corresponding solid bed, to the substantially horizontal first face of the corresponding individual distributor by which the latter is connected to the general distributor.

2. A reactor according to claim 1, wherein the height $l_1$, the width $l_2$ and the thickness $l_3$ of each powdery solid bed are such that:

$l_1 > l_2 > l_3$, 2 mm $\leq l_3 \leq$ 2 000 mm and 50 mm $\leq l_2 \leq$ 10,000 mm.

3. A reactor according to claim 2, wherein:

$l_1 \geq 2 l_2$, 5 mm $\leq l_3 \leq$ 500 mm and 100 mm $\leq l_2 \leq$ 5 000 mm.

4. A reactor according to claim 1 wherein, in each substantially parallelepipedic channel situated between two elementary reaction cells next to each other and in each substantially parallelepipedic channel situated between a wall of the reactor and the elementary cell the closest to this wall and substantially parallel to this wall, substantially horizontal adjacent ducts are provided by means of corrugated metal sheets, the sections of said ducts having one of the following forms: rectangular, triangular and sinusoidal.

5. Apparatus according to claim 1, wherein said first faces are substantially parallel to one another.

6. In a reactor comprising at least one means for introducing a charge, at least one means for removing the processed charge, at least one means for introducing a powdery solid in the upper part of said reactor, at least one means for removing said solid from the lower part of said reactor, said reactor further comprising:

at least two elementary reaction cells spaced apart from each other and spaced apart from the walls of said reactor, substantially vertical and parallelepipedic and substantially parallel to each other, at least two of said elementary reaction cells next to each other defining a substantially parallelepipedic channel; and at least one of said walls together with an elementary cell closest to said wall and substantially parallel to said wall defining a substantially parallelepipedic channel; said channels being suitable for gas flow, each of said cells being formed of the three following substantially parallelepipedic enclosures:

an individual charge distributor, an individual processed charge collector, a powdery solid bed inserted between said individual distributor and said individual collector, said bed being open, over the whole of a substantially vertical first face of said individual distributor and open, over the whole of the first face of said individual collector, said first faces each being defined by a wall permeable to fluids and impermeable to solid particles.

7. Apparatus according to claim 6, wherein said first faces are substantially parallel to one another.

8. In a reactor comprising at least one means for introducing a charge, at least one means for removing the processed charge, at least one means for introducing a powdery solid in the upper part of said reactor, at least one means for removing said solid from the lower part of said reactor, said reactor further comprising:

at least two elementary reaction cells spaced apart from each other and spaced apart from the walls of said reactor, substantially vertical and parallelepipedic and substantially parallel to each other, at least two of said elementary reaction cells next to each other defining a substantially parallelepipedic channel; and at least one of said walls together with an elementary cell closest to said wall and substantially parallel to said wall defining a substantially parallelepipedic channel; said channels being suitable for gas flow, each of said cells being formed of the three following substantially parallelepipedic enclosures:

an individual charge distributor, an individual processed charge collector, a space for a powdery solid bed between said individual distributor and said individual collector, said bed being open, over the whole of a substantially vertical first face of said individual distributor and open, over the whole of the first face of said individual collector, said first faces each being defined by a wall permeable to fluids and impermeable to solid particles.

* * * * *